Oct. 24, 1944.    W. A. ANDERSON    2,361,002
COMPUTING MACHINE
Filed Dec. 30, 1941    10 Sheets-Sheet 1

INVENTOR
WALTER A. ANDERSON
BY
*K. S. Julihn*
ATTORNEY

Oct. 24, 1944.    W. A. ANDERSON    2,361,002
COMPUTING MACHINE
Filed Dec. 30, 1941    10 Sheets-Sheet 2

INVENTOR
WALTER A. ANDERSON
BY
*R. G. Julihn*
ATTORNEY

Oct. 24, 1944.   W. A. ANDERSON   2,361,002
COMPUTING MACHINE
Filed Dec. 30, 1941   10 Sheets-Sheet 6

INVENTOR
WALTER A. ANDERSON
BY
*R. G. Julihn*
ATTORNEY

INVENTOR
WALTER A. ANDERSON
BY
ATTORNEY

Patented Oct. 24, 1944

2,361,002

UNITED STATES PATENT OFFICE 2,361,002

COMPUTING MACHINE

Walter A. Anderson, Bridgeport, Conn., assignor to Underwood Elliott Fisher Company, New York, N. Y., a corporation of Delaware Application December 30, 1941, Serial No. 424,972

5 Claims. (Cl. 235—62)

This invention relates to computing machines and more particularly to machines of this class that are used in merchandising transactions and the like and to automatic cycling mechanism therefor.

Generally these machines record individual purchases together with the totals thereof upon a slip that is handed to the customer as a record of the transaction. It is customary to print a unit count opposite each item and to print the total unit count opposite the total amount on the sales slip. Often, it is necessary to print and accumulate a tax amount such as a sales tax, the procedure being to first take a sub-total of the items purchased, mentally compute the percentage tax thereon and index the tax on the amount keys for accumulation on the totalizer and printing on the slip preparatory to taking the totals. Since the tax amount is entered last, it is desirable to have the machine automatically cycle to print the totals immediately following its entry, so that manipulations of the conventional motor bar and total key are eliminated, and speed of operation thereby increased.

It is an object of the present invention therefore, to provide a construction whereby operation of a single manipulative member, such as a tax key, immediately following the setting up of an amount on the keyboard, will cause the machine to operate three cycles; the first cycle accumulating the tax amount set up on the keyboard, the second cycle preparing the machine for taking totals, and the third cycle resetting the totalizer and printing the totals of the items and item counts on the work sheet.

Another object of the invention is to provide a means for automatically advancing the tally or work sheet to a point where printed totals will lie above the tear plate, ready for severance from the supply roll.

With these and incidental objects in view, the invention consists in certain novel features of construction and combinations of parts, the essential elements of which are set forth in appended claims, and a preferred embodiment of which is hereinafter described with reference to the drawings which accompany and form part of the specification.

The invention is shown as applied to a machine of the character disclosed in U. S. Pats. Nos. 1,198,487, 1,583,102, 1,925,735, 1,934,747, 1,965,611, 2,088,982, 2,251,099, and 2,251,100.

Operating mechanism generally

Figures 1, 2, 20:
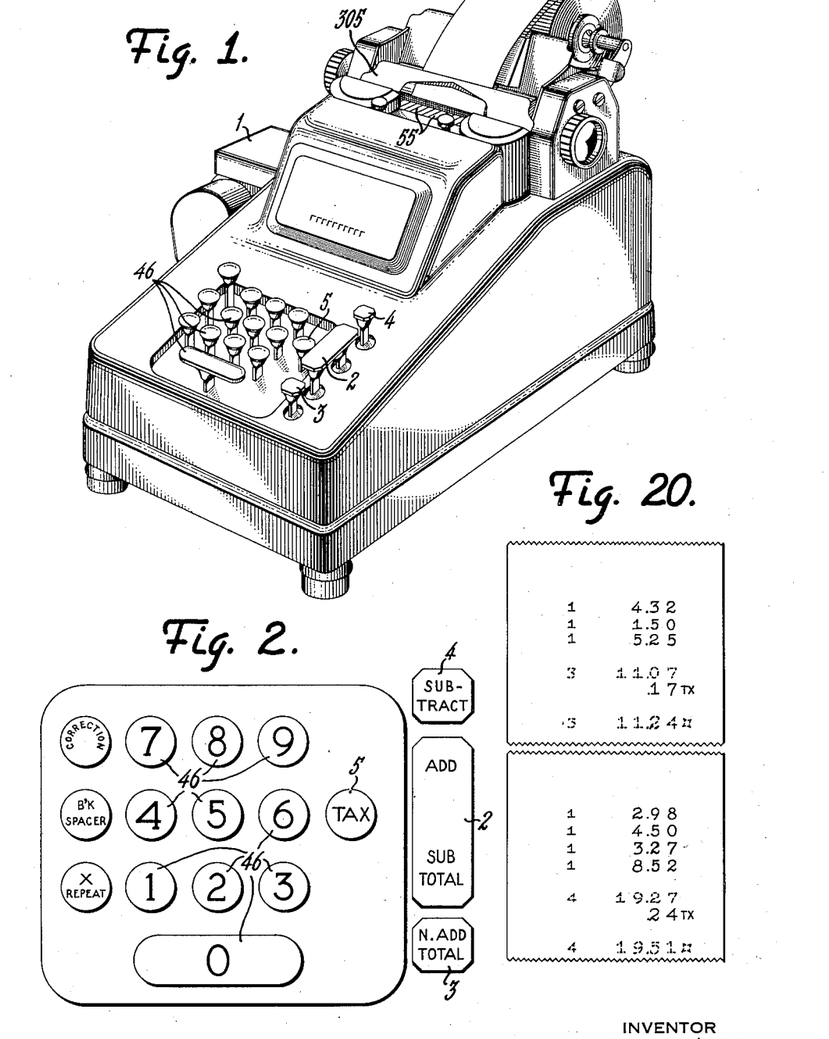
Figure 1 is a perspective view of a computing machine on which the invention is adapted to be used.
Figure 2 is a plan view of the keyboard thereof.
Figure 20 illustrates an example of the work performed, particularly a tax printing operation.

This is an improvement on the machines disclosed in the above-enumerated patents. The machine is operated by an electric motor 1 (Figures 1 and 3) under the control of the various operation control keys including the motor bar 2 which serves as a dual add and subtotal key, the dual nonadd-total key 3, the subtract key 4 and the tax key 5. The shaft of the motor is suitably connected to a worm 6 (Figure 3) meshing with a driving gear 7 freely rotatable on a driven shaft 8. The opposite end of shaft 8 is operatively connected to the main rock shaft 11 of the computing machine by suitable crank arm connections such as disclosed in Patents Nos. 1,925,736 and 2,251,100. Gear 7 has an extended hub 12 having a series of notches 13 in its periphery.

The means for communicating movement from the driving gear 7 to the driven shaft 8 includes the disk 14 fixed on the outer end of the driven shaft 8. A dog 15, pivoted upon the inner surface of disk 14, has depending lug 16 arranged to engage notches 13 of hub 12. A spring 17, connected to the end of the dog, constantly urges the dog counter-clockwise tending to effect engagement with one of the notches.

Engagement of the dog with hub 12 causes plate 14, together with shaft 8, to rotate with the driving gear 7. When shaft 8 is so rotated, it imparts oscillatory movement to the main rock shaft 11 through the crank connections above mentioned.

Engagement of the dog is controlled by a plunger stop 18 mounted for reciprocal vertical movement substantially in the plane of movement of the dog 15. The lower end of stop 18 normally lies in the path of a lug 21 formed integral with an extended portion of dog 15. Abutment of lug 21 against stop 18 rocks dog 15 clockwise against the tension of spring 17, disengaging the clutch so that normally shaft 8 is disconnected from driving gear 7. As hereafter will appear, stop 18 may be raised under the control of any of the above-mentioned operation controlling keys including motor bar 2, in a manner to be later explained, to permit engagement between the driving and driven members. Motor bar 2 is tensioned upwardly by a spring 22 connected between the stem of the motor bar and the machine frame. A plate 23, slidably mounted on studs 24 secured in the stem of the motor bar and connected for movement with the motor bar by a spring 25, is pivoted at its lower end to a crank arm 26 of a transversely extending rod 27, mounted within a slot 28 in the base of the computing machine. The opposite end of rod 27 is pivoted to a link 31. The rear end of link 31 is pivoted at 32 to a bell crank 33 pivoted at 34. The opposed arm of bell crank 33 is pivoted to a slide 35 that is guided for vertical movement. The upper end of slide 35 is pivoted at 36 (Figure 4) to one end of a lever 37 pivoted at 38 in a post 41 fixed in the motor housing. The opposite end of lever 37 is pivoted in a slot 42 provided in the upper end of stop 18.

Figures 3, 4:
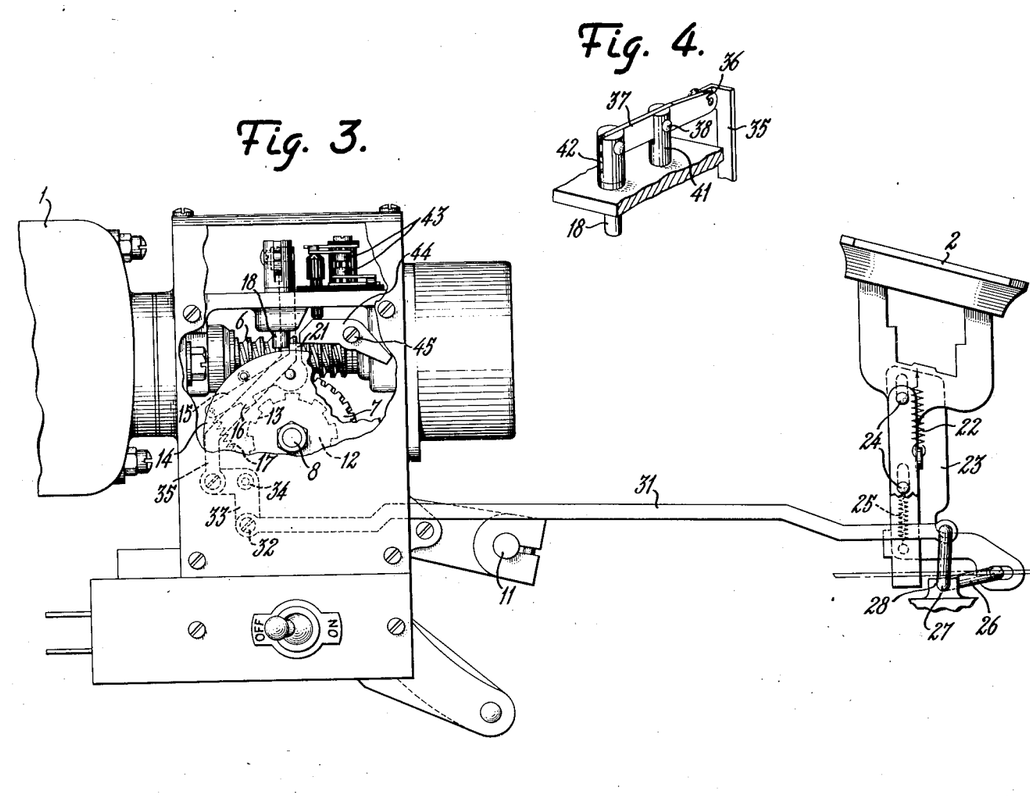
Figure 3 is a left side elevation of the motor actuating mechanism.
Figure 4 is a detail perspective view of the clutch dog release therefor.

When the parts are in the normal position shown in Figure 3, spring 22 serves not only to hold the motor bar in its upper position, but also, through the linkage just described, normally holds stop 18 in its lower effective position. Upon the depression of the motor bar, rod 27 rocks clockwise, pulling link 31 toward the right, in turn rocking bell crank 33 counter-clockwise to pull slide 35 downwardly and raise stop 18 out of the path of lug 21, to release dog 15 for engagement with notches 13.

The opening and closing of the motor circuit is controlled by a pair of electrical contacts 43 that are permitted to close under the control of lever 44 pivoted at 45. Lever 44 is arranged to be raised and lowered to control the opening and closing of the contacts by engagement and disengagement of lug 21 incident to engagement and disengagement of dog 15. In this manner, the driving means is maintained normally idle so as to prevent unnecessary wear and to conserve power.

This mechanism is identical with that disclosed in the aforementioned Patents Nos. 1,925,735 and 2,251,100.

By these parts, depression of motor bar 2 against the tension of spring 22 causes the machine to operate through one cycle. However, if the motor bar is held depressed so that the tension of spring 22 is not effective to return it and its associated parts, at the end of the operation, the machine continues operating until the motor bar is released.

Operation of the motor under the control of the various control keys will be described in conjunction with specific operations to be later described.

Indexing, differential and printing mechanisms

The following mechanisms are similar to the corresponding mechanisms disclosed in Patents Nos. 1,583,102 and 1,965,611, so that explanation thereof will be made only in a general way.

Figures 13, 14:
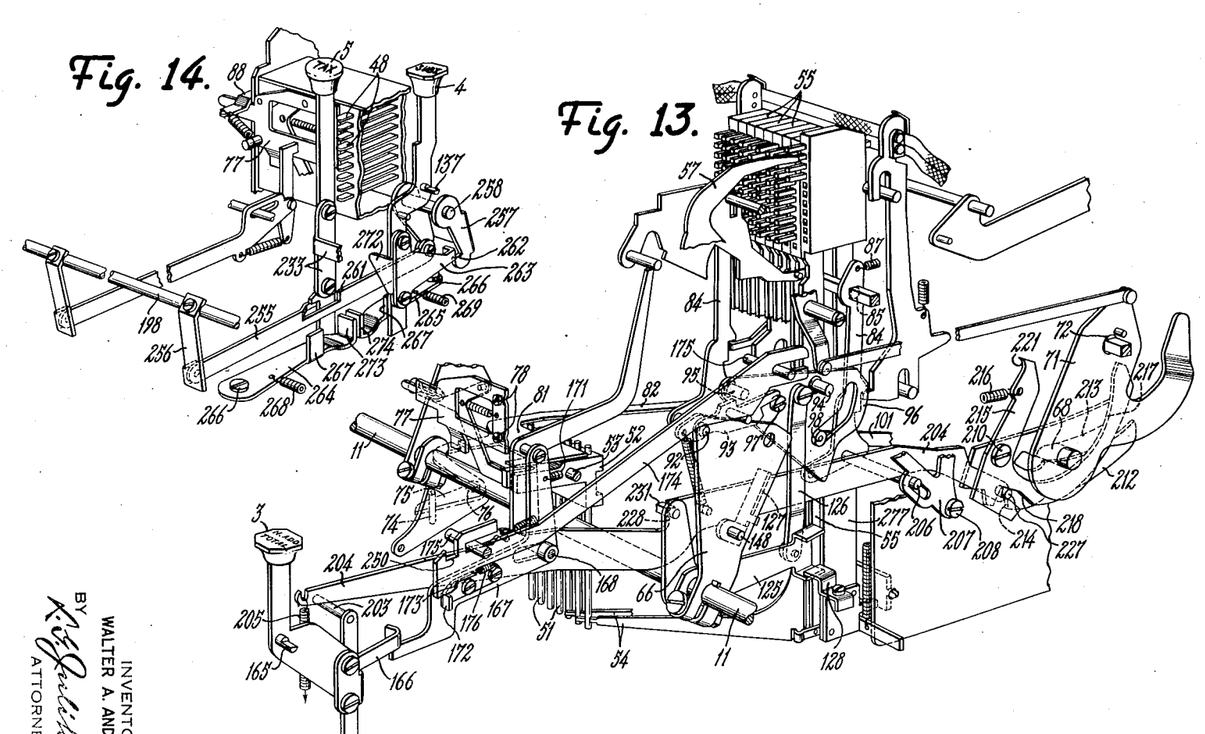
Figure 13 is a perspective view taken from the right, and generally similar to Figure 12, but with the parts shown in the positions that they occupy at mid-cycle position showing a total operation.
Figure 14 is a perspective view taken from the left, showing the tax and subtract keys and certain locks therefor.

Amounts to be entered in the machine are indexed on the amount keys 46 (Figures 1, 2 and 5), which, through a vertical row of horizontally disposed push pins 47, set index pins 48 to the rear a distance sufficient for their rear ends to lie in the plane of a series of rods such as 51 (see also Figure 13). Rods 51 are slidable vertically in a frame 52 slidable along a rod 53 from left to right in the machine. The lower ends of rods 51 are connected to arms 54, pivoted to type bars 55 mounted for vertical movement in the machine. A series of type 56 are carried by each type bar to cooperate with a platen 50 to print amounts and totals. A series of hammers such as 57 and their customary controls are provided to effect printing. Two sets of racks 58 and 59 (Figure 5) are suspended from arms 62, extending rearwardly from type bars 55, to actuate a totalizer comprising a series of pinions 63 mounted on a shaft 64. The type bars and actuating racks are raised and lowered by levers 65 connected to type bars 55, levers 65 in turn being actuated by drive shaft 11. The connection between shaft 11 and levers 65 includes a plate 66.

(Figure 9) and a link 67 pivoted to plate 66 and to a stud 68 in one of a pair of similar levers 71 pivoted on studs such as 72. Levers 65 are flexibly connected to levers 71 by springs 73 (Figure 5) and other parts fully disclosed in Patent No. 1,965,611.

Figure 5:
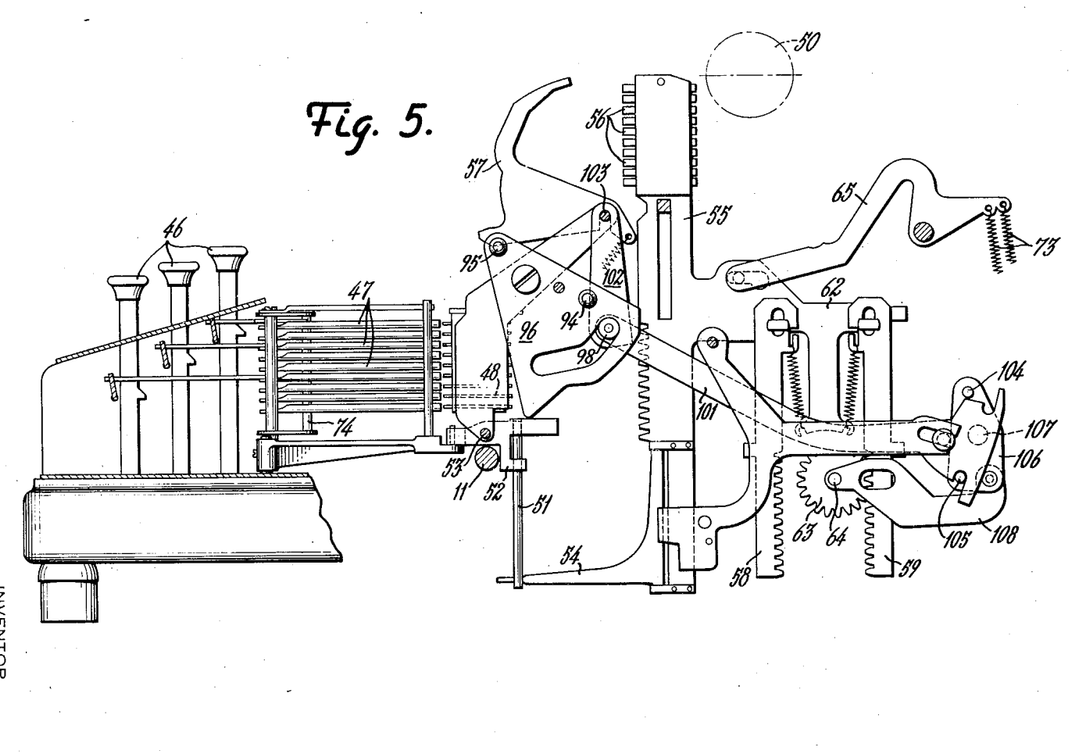
Figure 5 is a right side elevation of the machine structure generally, showing the totalizer together with certain of its control mechanism.

As the amount keys 46 are depressed, a suitable escapement causes frame 52 to move from left to right (Figure 13) one step for each amount key depressed, placing rods 51, one at a time beneath the set pins 48 (Figure 5). Also, push pins 47 move from left to right with frame 52 so that only one pin 48 in each vertical row may be set.

Figures 15, 15A:
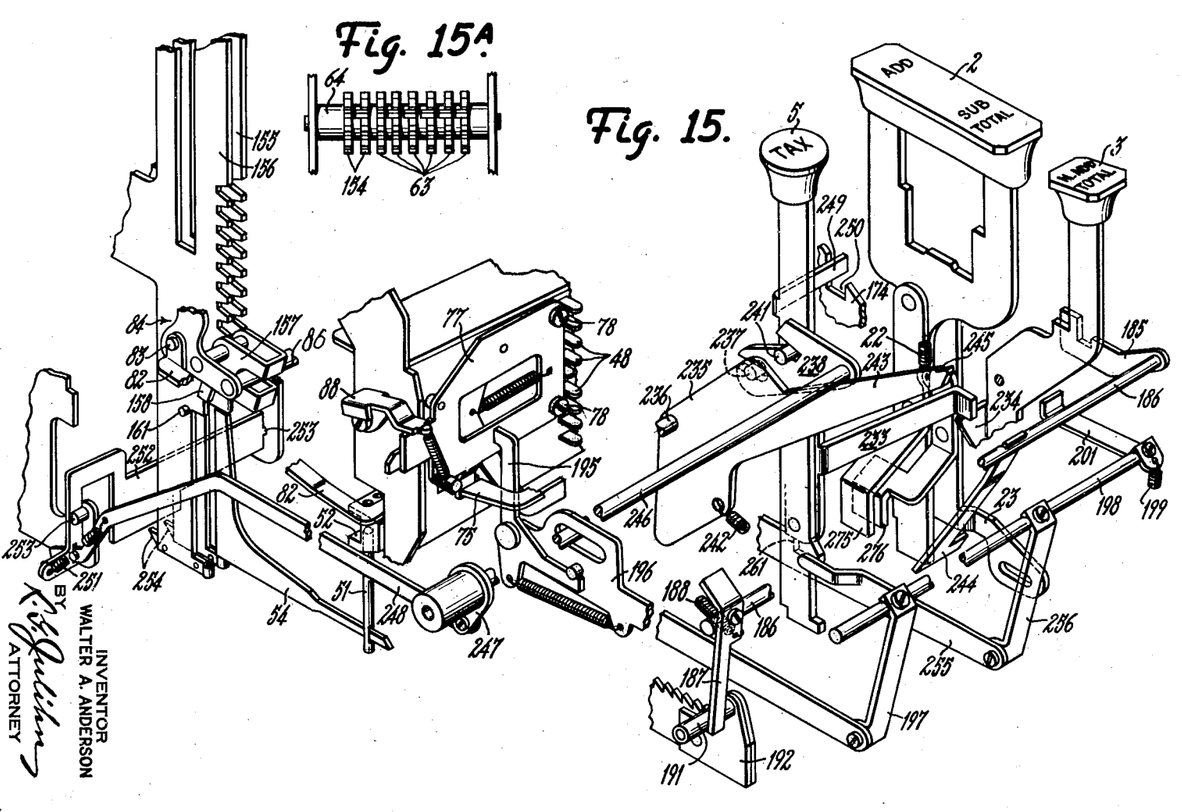
Figure 15 is a perspective view taken from the left, showing type bars associated with the item counter, the tax key and mechanism for disabling the item counter upon depression of the tax key.
Figure 15a is a top plan view of the totalizer, showing the item counter wheels.

As the first amount key is depressed, a universal rod 74 (Figure 5) on the indexing mechanism moves a lever 75 (Figure 13) clockwise about its pivot 76 to move a plate 77 a slight extent about its pivot 78. The pivot 78 consists of two screws passing through large openings in the plate, there being sufficient clearance between the plate and the machine frame to allow the plate to pivot. Movement of plate 77 clockwise (rearwardly in the machine) moves the forward end 81 of a plate 82 rearwardly in the machine. As shown in Figure 15, plate 82 is pivotally connected at 83 to a frame 84 composed of two similar members, one on each side of the machine, pivoted on a rod 85 and connected by a rod 86 for uniform movement. Springs such as 87 connected to the upper ends of members 84 tend to move plate 82 forward, but are prevented by a spring detent 88 (Figures 14 and 15). Rearward movement of plate 82 places the end 81 above rods 51, so that during the printing of an item only the rods that are moved to the right of the plate are permitted to rise during the machine cycle. In this manner, only the type bars necessary to print the digits of an indexed number are allowed to rise from their zero positions.

*Totalizer engaging and disengaging mechanism*

To engage and disengage the totalizer with actuating racks 58 and 59, shaft 64 is moved forwardly and rearwardly in the machine (left and right in Figure 5). To shift the totalizer in this manner, plate 66 (Figure 9) has pivoted thereon at 92 a pawl 93. Pawl 93 engages studs 94 and 95 on the initial and return strokes of drive shaft 11 to oscillate the plate 96 carrying studs 94 and 95, first counter-clockwise, then clockwise about its pivot 97 during each machine cycle. Oscillation of plate 96 moves a stud 98, embraced by a cam slot in plate 96, and a link 101 (Figure 5) to the left and then to the right, stud 98 being carried by a link 102 pivoted at 103, and connecting the forward end of link 101 with link 102. Link 101 at its rear end has two notches to cooperate with two studs 104 and 105 on one of two similar levers 106 secured to a shaft 107 journaled in the machine frame. Two identical links 108 connect levers 106 with the totalizer shaft 64. During adding operations, link 101 is connected with stud 105, so that movement of link 101 to the left, at the beginning of an operation, moves the totalizer from the position shown in Figure 5, where it is engaged with adding racks 59, to its disengaged position, where it lies midway between racks 58 and 59. Movement of link 101 to the right, at the beginning of the second half of a cycle, returns the totalizer to the position shown in Figure 5.

Figures 16, 17:
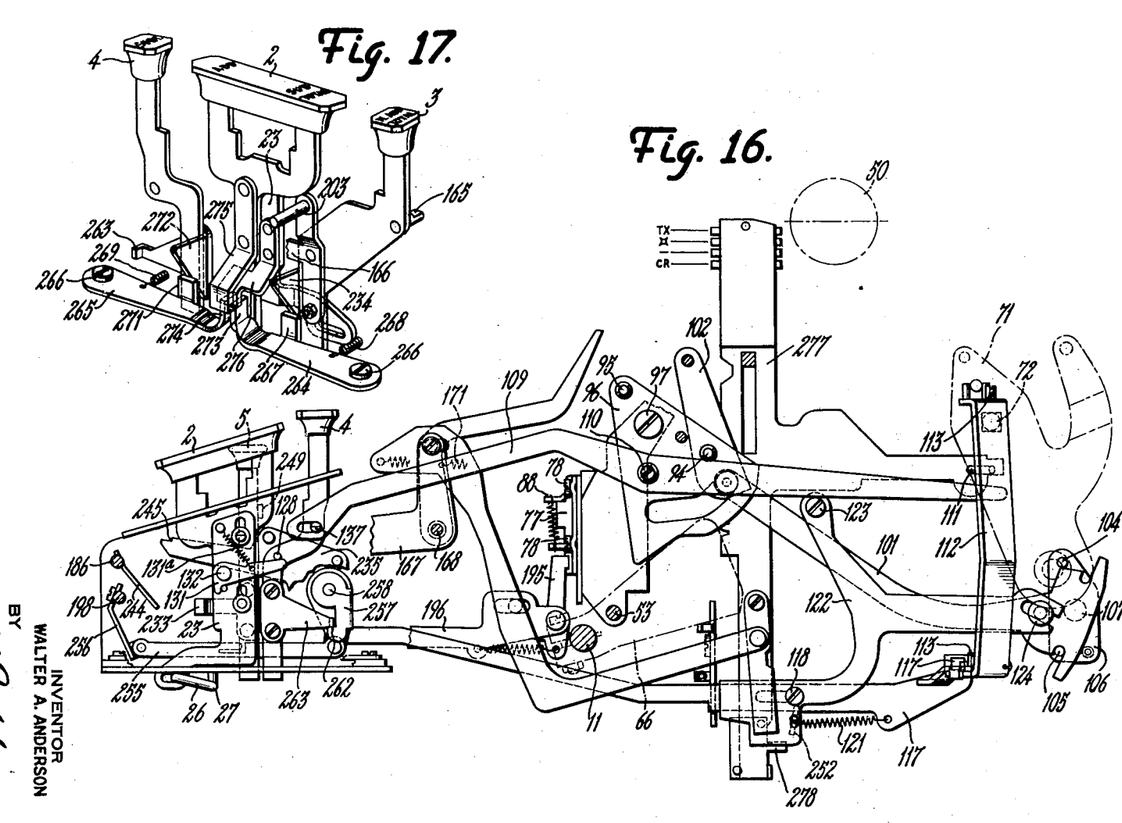
Figure 16 is a right side elevation, showing a signal printing type bar and the control mechanism therefor.
Figure 17 is a detail perspective view taken from the left, showing an interlock mechanism between the subtract, add-subtotal, and nonadd control keys.
Figures 18, 19:
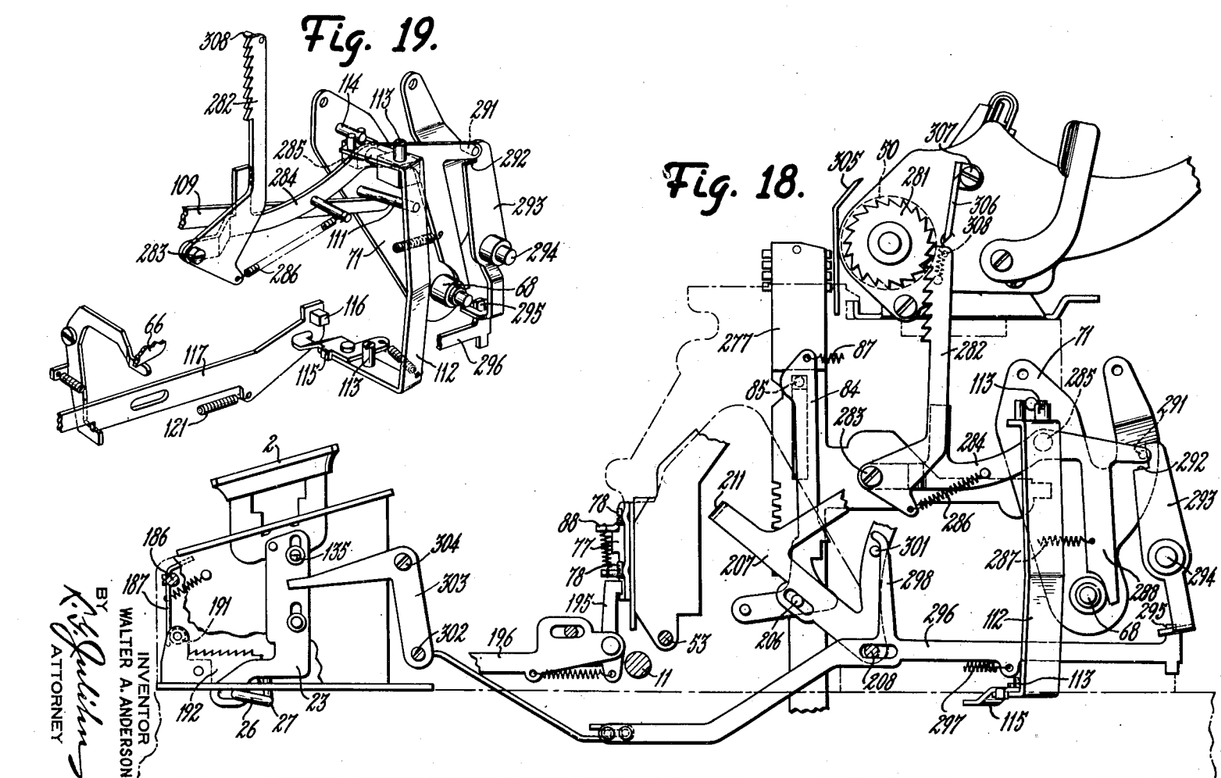
Figure 18 is a right side elevation, showing a mechanism for imparting a long feed to the tally to bring the total printing line of the tally to a point above the tear plate at the completion of a total cycle.
Figure 19 is a fragmental perspective view thereof.

Depression of subtract key 4 (Figure 16) rocks a lever 109 counter-clockwise about its pivot 110 and causes the rear end of the lever to engage a pin 111 fixed in a bail 112. Bail 112 (Figure 19) is mounted for vertical movement on studs 113 and is arranged to be oscillated upon the studs during each cycle of the machine by a connection 114 with lever 71. The lower end of the bail carries a yieldingly supported projection 115 which is elevated into the path of a stud 116 secured on a slide 117 when the bail is raised as above described. Slide 117 is yieldingly connected by a pin and slot connection 118 (Figure 16) and by a spring 121 to a lever 122 pivoted at 123 in the machine frame and having a pin and slot connection 124 with link 101. When bail 112 rocks clockwise during the fore part of a cycle, projection 115 strikes stud 116 and thrusts slide 117 rearwardly stretching spring 121. The stretching of spring 121 tensions the rear end of link 101 upwardly, so that when it is given its movement to the left at the beginning of an operation, the upper notch in the link engages stud 104. The subsequent movement of link 101 to the right thereupon moves the totalizer into engagement with racks 58 (Figure 5) for subtracting. This structure, apart from lever 109 and its connection with subtract key 4 for independent manipulation of bail 112, is identical with that used in the conventional overdraft mechanism fully disclosed in Patent No. 2,088,982.

*Adding and subtracting*

Motor bar 2 serves as an add key, only when it is depressed following the indexing of an amount on the amount keys. To add, an item is indexed on amount keys 46 and motor bar 2 depressed. Oscillation of drive shaft 11 (Figure 9) through pawl 93 and stud 94 disengages the totalizer from the actuating racks. During the remainder of the first half of the cycle, type bars 55 (Figure 5) rise differentially under control of the index pins 48, actuating racks 58 and 59 rising with the type bars. At the beginning of the last half of the cycle, pawl 93 (Figure 10) engages stud 95, returning plate 96, link 101, lever 106, links 108 and the totalizer to their positions shown in Figure 5 where the totalizer is engaged with the adding racks 59. During the remainder of the last half of the cycle, the type bars and actuating racks are lowered to the position shown in Figure 5, entering on the totalizer the amount indexed on the keyboard.

For subtracting, the same movements take place except that at the beginning of the last half of the cycle, due to the fact that the rear end of link 101 is tensioned upwardly by depression of the subtract key 4, the link is engaged with stud 104 instead of stud 105, engaging the totalizer with subtracting racks 58. This rotates the totalizer in the opposite direction, causing the number indexed on the keyboard to be subtracted from the totalizer. Initiation of a machine cycle by depression of subtract key 4 is effected by a pin 128 (Figure 16) on the stem of the subtract key 4 lying above a spring tensioned arm 131 pivoted at 132 to plate 23 and tensioned counter-clockwise by a spring 131a. By this connection, depression of key 4 depresses plate 23 against the tension of inferior spring 25 (Figure 3) to operate the cycling mechanism in the same manner as when motor bar 2 is depressed.

During adding and subtracting operations, a latch mechanism cooperating with the operation controlling keys is effective to hold either subtract key 4 or motor bar 2 depressed until the single cycle necessary for an adding or a subtracting operation is completed. This mechanism comprises a latch slide 133 (Figure 6) having a notch 134 arranged to engage a stud 135 fixed in the stem of motor bar 2 and a notch 136 arranged to engage a stud 137 fixed in the stem of subtract key 4. Slide 133 is mounted for slight longitudinal movement by screws 138 passing through elongated openings 141 in the slide and secured in the side walls of the keyboard housing. A hook 142 is pivoted at 140 to the slide. The hook 142 is tensioned clockwise by a spring 143 secured between a projection of the hook and a stud 144 fixed in the housing, and rests against a reduced portion of a stud 145 fixed on a sliding link 146. Thus, spring 143 tensions slide 133 forwardly.

Link 146 is slidably mounted upon stud 144 at its forward end and is bifurcated at its rearward end to slidably embrace rock shaft 11 adjacent arm 66. An upstanding lug 147 formed on the extreme rear end of link 146 is arranged to abut a pin 148 secured in arm 66. A spring 151 urges link 146 forwardly and holds lug 147 in contact with pin 148. When motor bar 2 or subtract key 4 is depressed, stud 135 or stud 137 engages notch 134 or notch 136 of slide 133 as it comes forward under the tension of spring 143, latching the motor bar or the key down.

As the machine cycles, on the forward stroke, arm 66 swings upwardly, moving pin 148 away from lug 147 allowing link 146 to move forward under the tension of spring 151, whereupon stud 145 is brought into operative engagement with hook 142. On the return stroke of the instant cycle, arm 66 swings downwardly, bringing pin 148 against lug 147, pulling link 146 and slide 133 (by virtue of its engagement with hook 142) rearwardly, and retracting notch 134 from stud 135 or notch 136 from stud 137, whereupon the depressed key rises to normal position. As slide 133 moves farther rearwardly, a projection 152 on hook 142 strikes a stationary lug 153, swinging hook 142 counter-clockwise about its pivot 140, disengaging it from stud 145, whereupon slide 133 restores to its normal position under the influence of spring 143.

Item counter

Mechanism is provided to automatically effect a count of "1" for each item accumulated on the totalizer. Two wheels 154 (Figure 15A) to the left of the amount accumulating wheels 63 are allocated to counting items, the transfer lug of the highest order wheel of the amount accumulating wheels being removed so as to prevent a carry from this wheel to the units order wheel of the item counter. The rod 51 (Figure 15) associated with the units order type bar 155 of the item counter is so positioned in frame 52 that indexing of an amount on amount keys 46 will never remove this rod from beneath plate 82. This rod 51, as shown in Figure 15, is shorter than the conventional rods 51, so that as the type bars and racks ascend during the fore part of a cycle, its type bar 155 rises to the "1" printing position instead of to the usual "0" printing position. Hence, upon descent of the bars and racks during the second half of the cycle, the "1" just printed is accumulated on the units order wheel 154 of the item counter. The tens order bar 156 of the item counter has no arm 54 and rod 51 connected with it, but is prevented from rising above zero printing position during accumulating cycles by a detent 157 mounted for movement with the swinging frame 84. Rearward movement of plate 82, incident to the indexing of an amount on the amount keys, swings frame 84 rearwardly from the position shown in Figure 15 and places the lower end 158 of detent 157 above a stud 161 secured in the tens order type bar 156. During total-taking operations, plate 82 and detent 157 occupy the positions shown in Figure 15 so that bars 155 and 156 are free to rise and print the total amount of the item count.

Nonadding

Figure 11:
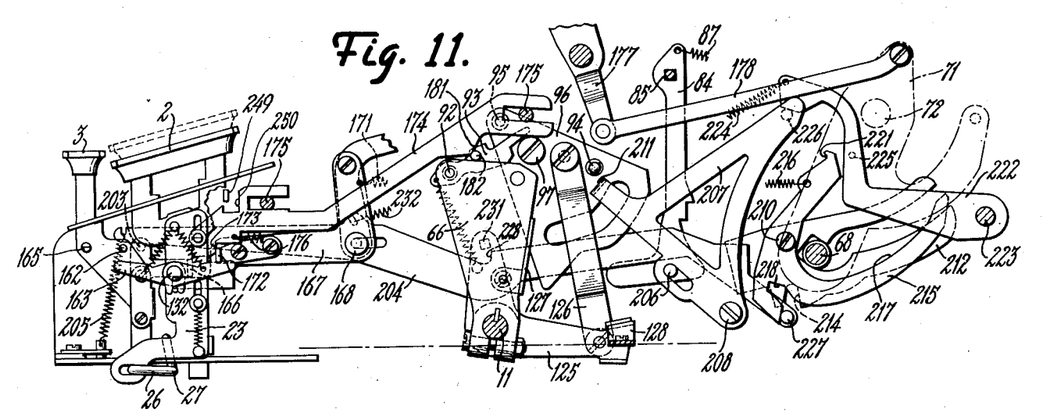
Figure 11 is a view similar to Figure 10, but with the parts shown in the positions that they occupy at mid-cycle position but with a subtotal operation.
Figure 12:
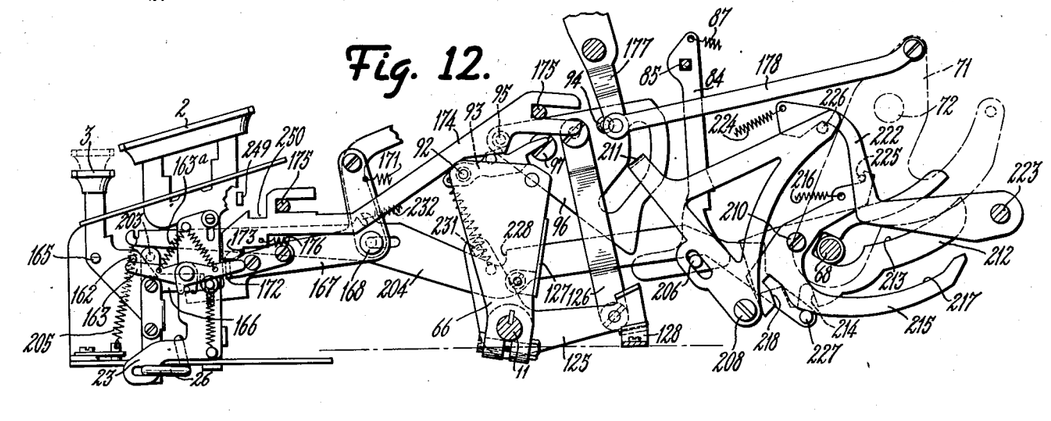
Figure 12 is a view similar to Figure 11, but with the parts shown at mid-cycle position showing a nonadd operation.

Depression of the nonadd-total key 3 following the indexing of an amount upon amount keys 46 causes the amount to be printed, but not added on the totalizer. Referring to Figures 11 and 12, the stem of the nonadd-total key carries a pin 162 overlying a spring tensioned arm 163 pivoted to plate 23 at 132, so that depression of the key depresses plate 23 against the tension of spring 25 (Figure 3) to operate the cycling mechanism in the same manner as when either motor bar 2 or subtract key 4 are depressed. Key 3 is latched in its depressed position by engaging a notch 164 (Figure 6) in the forward end of latch slide 133. Operation of slide 133 by engagement of hook 142 with stud 145 near the end of the cycle releases key 3 similarly to the release of keys 2 and 4 as above described in connection with adding and subtracting operations.

An arm 166 (Figure 13) on the stem of key 3 overlies the forward end of a bell crank 167 pivoted on a stud 168. Bell crank 167 is normally tensioned clockwise about stud 168 by a spring 171 and carries a flange 172 that normally lies behind a shoulder 173 (Figure 12) formed on a slide 174. Slide 174 is mounted on studs 175 and is urged toward the right as viewed in Figures 11 and 12 by a spring 176. When the machine is in normal position, the forward end of an oscillating arm 177, connected by a link 178 to lever 71, strikes the left end of slide 174 and thrusts it toward the left so that shoulder 173 lies to the left of flange 172. Depression of key 3, through arm 166, rocks bell crank 167 counter-clockwise against the tension of spring 171, removing flange 172 from the path of shoulder 173 as shown in Figure 12. Upon the cycle being initiated by depression of key 3, arm 177 oscillates counter-clockwise and slide 174 moves toward the right its full extent of movement. This full movement of the slide brings a projection 181 (Figure 11), formed on the right end thereof, into the path of movement of a pin 182 secured in pawl 93. Engagement of pin 182 against projection 181 withholds the pawl from engaging stud 95. Consequently, during the second half of the cycle, the totalizer is withheld from engaging adding racks 59 so that the amount just printed is nonadded upon the totalizer. Toward the end of the instant cycle, as arm 177 oscillates clockwise, it strikes the right end of slide 174 and thrusts it leftwardly so that shoulder 173 is again placed to the left of flange 172, flange 172 restoring to its normal position as shown in Figure 11, concurrently with the release of key 3 incident to the withdrawal of latch slide 133.

Means of enforcing a blank cycle before taking a total

In order that any of the parts of the transfer mechanism that were tripped during the last accumulating operation may be restored, and in order that the totalizer may be engaged with the proper set of racks 59, or 58, for taking a positive or negative total, a means is provided for enforcing a blank cycle before a total can be taken. To do this, all the rods 51 (Figures 5, 13 and 15) are held against rising during the first cycle following an operation where one or more amount keys were not depressed. This is accomplished by leaving the end 81 (Figure 13) of plate 82, at the end of an accumulating operation, in its rear position where it overlies rods 51. With plate 82 overlying rods 51, the type bars are held from rising, so that a total cannot be taken during this cycle. During such a blank operation, as explained in Patent No. 1,583,102, plate 82 is moved forwardly to its position shown in Figures 13 and 15, so that a total can be taken in the following operation.

Taking a total

Figure 6:
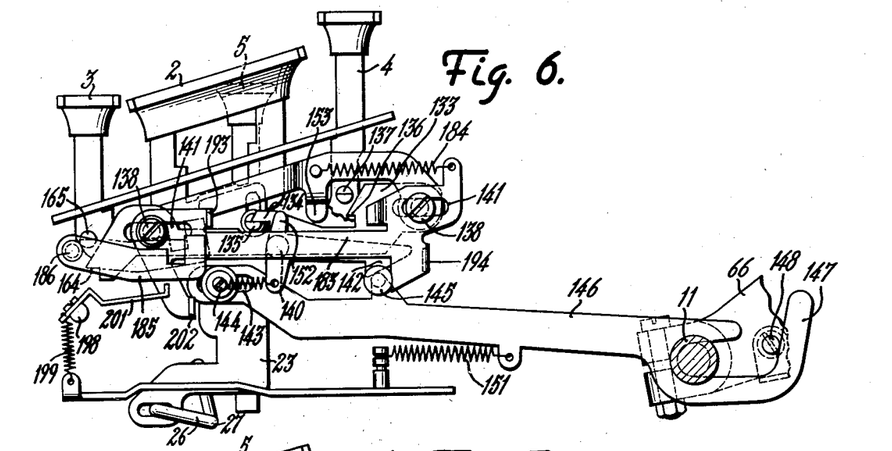
Figure 6 is a left side elevation of the automatic successive cycling mechanism and the operation control keys, showing the parts in position for initiating a blank cycle.

Depression of the nonadd-total key 3 with no amount indexed upon amount keys 46 initiates a double cycle of the machine, the first cycle being a blank cycle and the second cycle being an automatically initiated total cycle. The first cycle is initiated by the depression of plate 23 in the same manner as in a non-adding operation, stud 165 on the stem of key 3 becoming latched in notch 164 on slide 133 (Figure 6). The second cycle is effected by a slide 183 (Figures 6, 7 and 8) mounted on studs 138 and normally tensioned toward the left against stud 145 by a spring 184. Whenever slide 183 is permitted to move leftwardly its full extent of movement during a cycle, a succeeding cycle is automatically initiated. Slide 183 is controlled by the following parts. An arm 185 is secured to one end of a rod 186. The opposite end of rod 186 carries a finger 187 (Figure 15) tensioned rearwardly by a spring 188. The lower end of finger 187 normally bears against a roller 191 carried by a slide bar 192. Bar 192 corresponds to the bar 72 shown in Patent No. 1,198,487, and, as disclosed in that patent, is arranged to be moved step by step away from finger 187 whenever an item is indexed upon the amount keys and is restored to its normal position shown in Figure 15 during the return stroke of every cycle of the machine. Upon indexing the first digit of an amount on the amount keys, arm 185 moves upwardly to the dotted line position shown in Figure 6 under tension of spring 188. This movement places the right end of the arm in front of a flange 193 on slide 183 and thereby prevents the slide from full leftward movement as link 146 moves to the left so that a second cycle is not initiated during adding, subtracting and non-adding operations because in all of these operations an amount is indexed on the amount keys.

Figure 7:
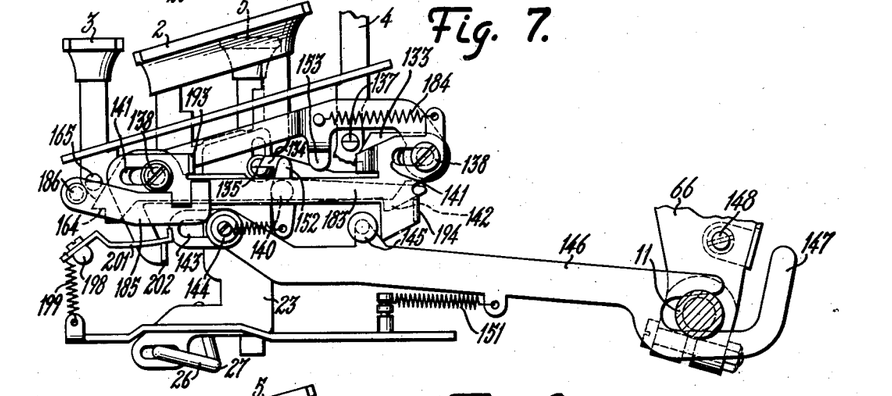
Figure 7 is a view similar to Figure 6, but with the parts shown in the positions that they occupy at the middle of the blank cycle operation.
Figure 8:
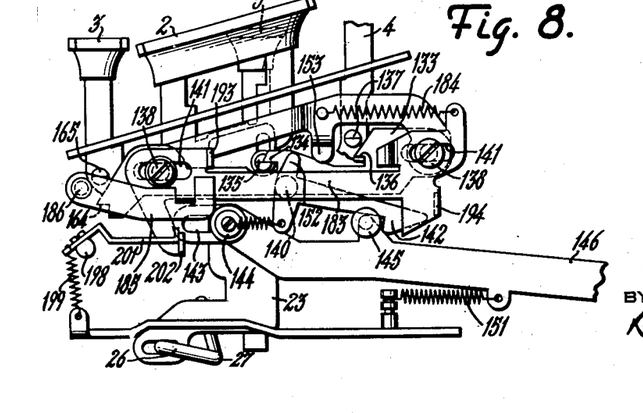
Figure 8 is a view similar to Figure 7, but with the parts shown in the positions that they occupy at the middle of a total cycle operation.

When no amount is indexed upon the amount keys, arm 185 remains in the full line position shown in Figure 6 and consequently, during the blank cycle, slide 183 is not blocked from moving leftwardly. During its leftward movement, a flange 194 on the right end of slide 183 engages the right end of hook 142, as shown in Figure 7, and prevents the hook from moving downwardly into engagement with stud 145, so that when stud 145 moves to the right during the latter part of the cycle, it will pass under the hook 142. During the last part of the cycle, stud 145 moves slide 183 to the right to its original position. This return movement of slide 183, however, occurs after the reduced portion of stud 145 is too far to the right to engage the vertical face of hook 142, so that slide 133 remains effective to hold key 3 depressed, and thereby causes a second cycle, during which the total is taken. During the blank cycle, as plate 77 (Figure 15) moves forwardly, it strikes an upstanding arm 195 yieldingly pivoted on one end of a link 196, and thrusts the link forwardly. The opposite end of link 196 is pivoted to an arm 197 secured on one end of a rod 198. An arm 201, preferably of flat spring stock, is secured on the opposite end of rod 198, and a spring 199 connected thereto normally tensions arm 201 and rod 198 clockwise and link 196 toward the rear. Incident to the forward thrust of plate 77 and link 196, arm 201 is yieldingly tensioned downwardly against the tension of spring 199, upon a flange 202 provided on the left end of slide 183, as shown in Figure 7. Immediately upon slide 183 being fully restored to the right at the end of the blank cycle, arm 201 descends in front of flange 202 as shown in Figure 8. Hence, during the ensuing total cycle, slide 183 is blocked against movement toward the left, and consequently hook 142 is permitted to engage stud 145 to move slide 133 to the right and release total key 3.

Depression of key 3 also lowers a stud 203 (Figure 13), connected thereto, from a position directly beneath a lever 204, so that lever 204 will be free to pivot counter-clockwise on stud 168 during a total cycle, under tension of a spring 205 connected to the forward end of the lever.

Movement of plate 82 forwardly to its position shown in Figure 13, during the blank cycle, moves frame 84 forward with it. Forward movement of frame 84, through a rod 206, moves a lever 207 counter-clockwise about its pivot 208, by reason of the end of rod 206 lying within a slot in lever 207. This movement of lever 207 causes a flange 211 thereon (Figure 9) to strike pawl 93 and move it sufficiently to prevent it from cooperating with stud 94 at the beginning of the total-taking cycle. Thereafter, the totalizer remains engaged with the actuating racks during the first half of the total cycle, allowing the actuating racks and type bars to be moved differentially under control of the totalizer wheels.

To disengage the totalizer after the wheels are returned to zero, plate 96 is moved counter-clockwise by counter-clockwise movement of bell crank 125, as mentioned above, at the very end of the first half of the total-taking cycle. To do this, the following construction is provided.

Figure 9:
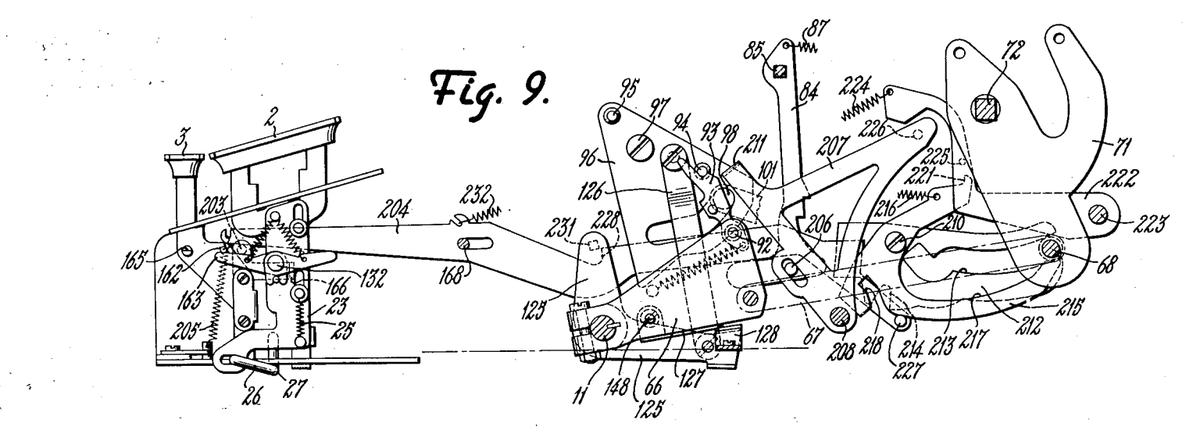
Figure 9 is a right side elevation of the totalizer control mechanism in normal position.
Figure 10:
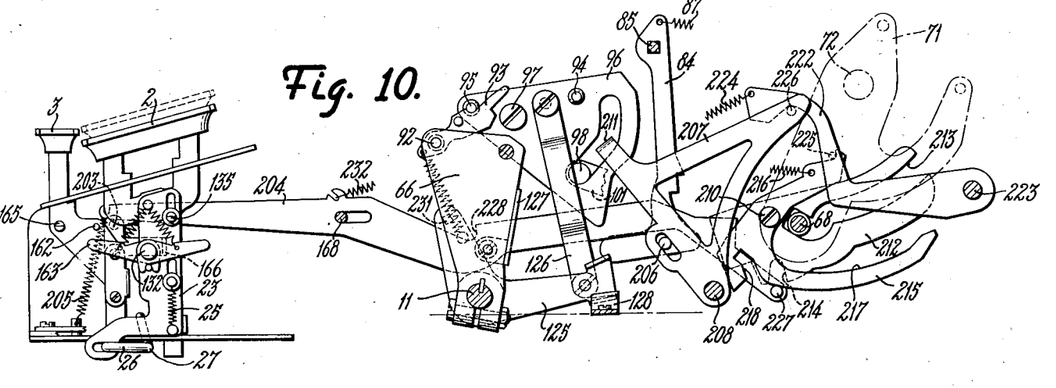
Figure 10 is a view similar to Figure 9, but with the parts shown at mid-cycle position of an adding operating.

A cam lever 212, pivoted at 210 and having a slot 213 (Figure 9), embraces stud 68, and is provided with a notch 214 on its lower edge. Another cam lever 215 is likewise pivoted at 210, and is tensioned counter-clockwise by a spring 216. Lever 215 has a cam edge 217 that bears against the lower side of stud 68 under the tension of spring 216, and has a short cam slot 218 in its lower edge and a hook 221 at its upper end. A lever 222 is pivoted on a rod 223 and is tensioned counter-clockwise by a spring 224, the counter-clockwise movement of the lever being controlled by stud 68, upon which the lower edge of the lever rests. Lever 222 carries a stud 225 which normally lies out of the path of hook 221. During accumulating operations, and during the blank cycle preceding the total taking cycle—in other words during operations in which frame 84 is in its rear position, as shown in Figure 9, a stud 226 on lever 207 lies in its rear position shown in Figure 9. During these operations, the forward movement of stud 68, during the first half of the machine cycle, allows lever 222 to move a sufficient distance counter-clockwise to bring stud 225 into the path of hook 221. Then upon stud 68 reaching its forward extremity, where it moves lever 212 counter-clockwise because of the configuration of the left end of cam slot 213, notch 214 is placed directly above a stud 227 secured to the rear end of lever 204 and resting on the lower edge of lever 215, as shown in Figure 12. However, since stud 225 is in the path of hook 221, lever 215 is held against counter-clockwise movement. Stud 227, therefore, does not rise into notch 214, but remains held in its lower position by lever 215. Lever 204 is therefore not operated during these cycles.

During the total-taking cycle, however, frame 84 and lever 207 are in their forward positions where stud 226 lies directly under the forward end of lever 222, as shown in Figure 11. Therefore, when stud 68 moves forward, lever 215 is free to move counter-clockwise.

As stud 68 completes its forward movement, lever 212 moves counter-clockwise as mentioned above, placing notch 214 above stud 227. Since lever 215 also has moved counter-clockwise, to the position shown in Figure 11, stud 227 rises into notch 214, whereupon further counter-clockwise movement of lever 215, through its spring 216, moves slot 218 into engagement with stud 227, locking the stud in notch 214. This rising of stud 227 is accompanied by a sufficient rising of the rear portion of lever 204 to place a shoulder 228 thereon immediately behind a stud 231 secured in the vertical arm of bell crank 125, as shown in Figure 13. This slight rocking of lever 204 is caused by the tension of spring 205.

During the first part of the second half of the cycle, stud 68 moves lever 212 clockwise to the position shown in Figure 13, moving stud 227 and lever 204 forwardly. This causes shoulder 228 to rock bell crank 125 counter-clockwise, moving plate 96 counter-clockwise, as desired, to disengage the totalizer from the actuating rack before they are lowered to their normal positions. The totalizer now stands at zero.

During the remainder of the cycle, stud 68 moves lever 215 clockwise to its position shown in Figure 9. This cams stud 227 downwardly out of notch 214, whereupon a spring 232, connected to lever 204 pulls the lever and stud 227 to their rear positions shown in Figure 9. During the last portion of the cycle, arm 127 strikes lug 128, and moves plate 96 clockwise, to its position shown in Figure 9 leaving the totalizer engaged with the actuating racks at the end of the operation.

Taking a subtotal

Subtotals are taken by depressing motor bar 2 with no amount indexed upon amount keys 46. This causes a double cycle of the machine in substantially the same manner that depression of key 3 with no amount indexed upon the amount keys causes a double cycle for taking a total. That is, slide 183 (Figures 6, 7 and 8) is permitted to move toward the left (Figure 6) its full extent of movement to prevent hook 142 from engaging stud 145 (Figure 7) during the first or blank cycle, during which arm 201 is conditioned to prevent slide 183 from full leftward movement during the ensuing automatically initiated second cycle. Consequently, during the second cycle, following the printing of the subtotal, shoulder 134 is withdrawn from stud 135, releasing motor bar 2. During the subtotal operation, as in the total operations, the totalizer remains in engagement with the racks during the fore part of the cycle, because during the blank cycles, lever 207 is moved forwardly to the position where flange 211 withholds pawl 93 from engaging stud 94.

However, unlike the taking of a total, the totalizer is not disengaged from the racks following the printing of the total. This is due to the fact that the stud 203 on the nonadd total key 3 (Figure 11) is not lowered by the depression of motor bar 2. Therefore, stud 203 remains in the position shown in Figure 11 and prevents stud 227 from entering notch 214 and cam slot 218, so that the totalizer remains engaged with the racks during the second half of the cycle, and the amount printed is re-accumulated on the totalizer wheels as the racks descend.

Three cycle operation by depression of tax key

Mechanism is provided on this machine whereby, following the listing and accumulation of a group of items and the taking of a subtotal thereof, a tax amount may be indexed on amount keys 46, and by depression of a single manipulative member, namely, the tax key 5, a three cycle operation will be initiated, the first cycle accumulating the tax amount, the second cycle being a blank cycle and preparing the machine for taking a total, and the third cycle being a total cycle, clearing the totalizer for the next operation.

Referring to Figure 15, an arm 233 formed on the stem of tax key 5 overlies a flange 234 formed on the stem of nonadd total key 3 so that depression of key 5 concurrently depresses key 3, and causes stud 165 (Figure 6) to be engaged by notch 164 in slide 133. This depression of key 5 therefore starts a machine cycle. A lever 235 (Figure 15) pivoted at 236 is connected by a pin and slot connection 237 to an arm 238 that is also connected by a pin and slot connection 241 to the stem of the tax key. A spring 242 connected to lever 235 normally urges the lever counterclockwise about pivot 236, and holds a projection 243 and tax key 5 in their upper positions shown in Figure 15. Upon depression of key 5, however, lever 235 is swung clockwise about pivot 236 a distance sufficient to bring the forward end of projection 243 into engagement with an angularly disposed finger 244 secured to rod 186, a notch 245 in the forward end of the projection engaging beneath the lower end of finger 244 to latch key 5 in its depressed position. Incident to the engagement of projection 243 with finger 244, shaft 186 is rocked counter-clockwise (Figure 15) an amount sufficient to lower arm 185 from the dotted line position shown in Figure 6 (to which the arm was just raised by the indexing of the tax amount) back to the full line position shown therein. Therefore, during the first cycle, slide 183 is permitted to move leftwardly its full extent of movement to prevent hook 142 from engaging stud 145, so that key 3 remains depressed to initiate a blank cycle immediately following the accumulating cycle. During the blank cycle, arm 201 is tensioned downwardly on flange 202 in the same manner as described previously in connection with a total-taking operation, so that at the end of the blank cycle arm 201 lies in front of flange 202 (Figure 8) to prevent full leftward movement of slide 183 during the ensuing automatically initiated total cycle. Therefore, during the total cycle hook 142 is permitted to engage stud 145 to withdraw slide 133 from stud 165 and release the total key. Tax key 5 is released at the end of the first cycle when roller 191 on slide bar 192 moves finger 187 counter-clockwise sufficiently to rock finger 244 out of engagement with notch 245.

The tax key is also provided with an arm 249 extending over a slot 250 in slide 174. When the key is depressed, arm 249 is lowered into slot 250 and thereby prevents slide 174 from moving to the rear during the one cycle that the tax key remains in depressed position. This allows the tax amount to be entered in the totalizer rather than being nonadded.

*Disabling item counter by depression of tax key*

Since it is desirable to not count the tax amount, the following parts are provided to disable the item counter during the tax amount printing operation. Arm 238 (Figure 15) is secured to the right end of a rod 246 extending across the machine and having an arm 247 secured on its opposite end. A link 248, pivoted at one end to arm 247, is yieldingly connected by a spring and slot connection 251 to a plate 252 pivoted at 253 in the machine frame. The lower edge of plate 252 normally lies just above and to the rear of lugs 254 secured on the lower ends of the item counter type bars 155 and 156. Depression of key 5 rocks shaft 246, pulling link 248 forwardly and rocking plate 252 counter-clockwise on its pivot so that the lower edge of the plate is brought forwardly, over lugs 254, thus locking bars 155 and 156 against vertical movement during the tax printing and accumulation cycle. This prevents operation of the item counter during this operation. When key 5 is released at the end of the tax printing cycle, plate 252 swings back to the ineffective position shown in Figure 15, under tension of spring 242.

*Key locks*

Locks are provided to prevent depression of either the tax key 5 or subtract key 4 unless an amount has been indexed upon amount keys 46. Referring to Figure 14, a link 255 is connected at one end to an arm 256 secured on rod 198 and is connected at its opposite end to a latch 257 pivoted at 258 in the machine frame. When an amount is indexed upon amount keys 46, and plate 77 is thereby thrust to its rear position as shown in Figure 14, link 255 concurrently moves rearwardly. Rearward movement of link 255 withdraws a shoulder 261 on the link from beneath the lower edge of the body portion of arm 233, so that key 5 is free to be depressed. Incident to the rearward movement of link 255, latch 257 swings rearwardly to the position shown in Figure 14, removing a shoulder 262 formed on latch 257 from beneath a lug 263 secured to the stem of subtract key 4 so that this key also is free to be depressed following the indexing of an item. During a blank cycle, however, when plate 77 moves forwardly, as previously described, link 255 and latch 257 are pulled forwardly, placing shoulders 261 and 262 in effective position so that neither key may be depressed until an amount is indexed on amount keys 46.

Another lock is provided to prevent depression of any of the operation controlling keys 2, 3, 4, or 5 during an operation. This mechanism comprises a pair of oppositely disposed levers 264 and 265 (Figures 14 and 17) pivoted at 266 in the machine frame. Lever 264 has an upstanding lug 267 which, under the tension of a spring 268, bears against an angular edge of the flange 234 formed on the nonadd total key 3. Lever 265 has a similar upstanding lug 271 which, under tension of a spring 269, bears against the angular edge of a similar flange 272 formed on the stem of subtract key 4.

The inner ends of each lever 264 and 265 have upstanding lugs 273 and 274 respectively, the upper ends of which lie just below and to one side of the lower ends of separate, angularly formed projections 275 and 276 secured on the stem of motor bar 2 and plate 23 respectively. When no operation controlling key 2, 3, 4 or 5 is depressed, springs 268 and 269 withhold lugs 273 and 274 from the path of downward movement of projections 275 and 276.

Upon depression of the add subtotal key 2, since plate 23 is lowered therewith, projection 276 is lowered to a position where its lower end lies immediately to the left (Figure 17) of lugs 274 and 273 thus locking keys 3, 4 and 5 against depression during adding or subtotaling operations. Referring to Figure 15, it will be noted that a locking of key 3 causes locking of key 5.

Depression of key 3 for either a nonadd or totaling operation cams lever 264 leftwardly against the tension of spring 268. As plate 23 and its projection 276 start to descend with key 3, plate 23 is held up by lug 273 until cam 234 has moved lug 273 to the left of projection 276. A strong spring 163a (Figure 12) extending between lever 163 and plate 23 permits the plate to be so held up. Lug 273 then lies directly beneath the lower end of projection 275. Hence, during nonadd or totaling operations key 2 is locked against depression by lug 273 blocking downward movement of projection 275, and key 4 is locked against depression because the lowering of projection 276 locks lever 265 against lateral movement.

Depression of key 4 to initiate a subtracting operation cams lever 265 leftwardly against the tension of spring 269. As plate 23 and its projection 276 start to descend, lug 274 is moved to the left of projection 276, to a position directly beneath the lower end of projection 275, spring 131a (Figure 16) permitting such operation. Hence, during a subtracting operation keys 2 and 3 are locked against depression in the same manner as above described, and locking of key 3 also locks key 5 as before stated.

*Symbol printing mechanism*

Mechanism is provided on this machine to print an appropriate symbol designating the character of the operation performed. This mechanism is similar to the symbol printing mechanisms disclosed in the before-mentioned patents. The symbol printing type bar 277 (Figure 16) is stopped in different elevations to print the debit total, minus, and credit total symbols by mechanism controlled by the corresponding operation controlling keys. This mechanism may be similar to that disclosed in U. S. Patent No. 2,251,099.

Type bar 277 is also stopped in a position to print a tax symbol whenever tax key 5 is depressed. To do this, a lug 278 is formed on the lower end of type bar 277 and lies in a position to be stopped by the lower edge of plate 252 whenever the plate is swung toward the left (Figure 16) by the key 5 being depressed. There is just sufficient distance between lug 278 and plate 252 to permit the type bar to rise to tax symbol printing position.

The symbol printing hammer 57 (Figure 13) is controlled in its operation in identically the same manner as disclosed in the before-mentioned patents.

Paper feeding mechanism

Mechanism is provided on this machine to advance the paper a single line space following an adding, subtracting, nonadding, subtotaling and tax printing operations, and to advance it a greater distance following a total printing operation, so that the printed total will lie above the tear plate. This permits the operator to tear the tape from the supply roll without manually rotating platen 50.

This mechanism includes a ratchet wheel 281 (Figure 18) secured on the right end of the platen shaft. Wheel 281 is engaged by a rack 282 pivoted at 283 to one arm of a lever 284 pivoted at 285. A spring 286, connected between the lower end of rack 282 and lever 284, normally tensions the teeth on the rack into mesh with the teeth on ratchet wheel 281. A spring 287, connected to a depending arm 288 of lever 284, normally tensions the lever clockwise about pivot 285, and holds the lower end of arm 288 against stud 68. A stud 291 secured in the right end of lever 284 lies above a shoulder 292 in a lever 293 pivoted at 294. The lower end of lever 293 is forked (see Figure 19) and embraces an upstanding lug 295 formed on the end of a slide 296. Slide 296 is tensioned toward the left by a spring 297 (Figure 18), but is restrained from leftward movement whenever lever 207 is in its rearmost position by an upstanding finger 298 formed on the slide and bearing against a pin 301 secured in lever 207. The forward end of slide 296 is pivoted at 302 to one arm of a bell crank 303 pivoted at 304 in the machine frame. The opposite arm of bell crank 303 lies a short distance below stud 135 in add subtotal key 2.

During adding, subtracting, nonadding and tax printing operations, lever 207 occupies its rearmost position as previously described, and pin 301 restrains slide 296 from moving leftwardly, so that shoulder 292 is held in the path of movement of stud 291. Therefore, as lever 71 swings clockwise during the fore part of a cycle, lever 284 swings only slightly clockwise about pivot 285. This movement is just sufficient to permit rack 282 to advance one tooth on ratchet wheel 281. Consequently, when arm 71 swings counter-clockwise during the latter part of the cycle, and stud 68 swings lever 284 counter-clockwise, rack 282 advances platen 50 a single line space.

Depression of add subtotal key 2 to initiate a subtotal-taking operation lowers stud 135 to a position where it blocks movement of bell crank 303, slide 296, and lever 293. Therefore, even though lever 207 moves forwardly during the blank cycle preceding the subtotal cycle, only a single line space is imparted to the platen 50 following the printing of the subtotal.

During total-taking operations, however, bell crank 303 is not blocked from movement by stud 135, so that when lever 207 moves forwardly during the blank cycle, slide 296 moves forwardly and withdraws shoulder 292 from the path of movement of stud 291. Hence, during the ensuing total cycle rack 282 is permitted to rise to a point where its lowest tooth engages ratchet wheel 281, so that upon restoration of the parts to normal, platen 50 is rotated several line spaces. This advances the paper to a point where the total, just printed, lies above the tear plate 305.

A spring tensioned plate 306 pivoted at 307 and having beveled upper and lower edges cooperates with a pin 308 secured in the upper end of rack 282 in such manner as to cam the rack out of engagement with the teeth of the ratchet wheel during the up stroke of the rack, and to permit the teeth of the rack to reengage the teeth of the ratchet wheel during the down stroke.

While the form of mechanism herein shown and described is admirably adapted to fulfill the objects primarily stated, it is to be understood that it is not intended to confine the invention to the one form of embodiment herein disclosed, for it is susceptible of embodiment in various forms all coming within the scope of the claims which follow.

What is claimed is:

1. In a machine of the class described having indexing mechanism including amount keys, and machine operating mechanism including cycle initiating means having a manipulative member, a latch for the cycle initiating means, means normally effective to restore the latch during each machine cycle, means for disabling the latch restoring means, a member movable when an amount key is operated to index an amount for rendering the disabling means ineffective, and means under the control of the manipulative member for rendering the movable member ineffective even though an amount has been indexed upon the amount keys.

2. In a machine of the class described having blank cycle enforcing mechanism, indexing mechanism including amount keys and machine operating mechanism including cycle initiating means having a manipulative member, a latch for the cycle initiating means, means normally effective to restore the latch during each machine cycle, means for disabling the latch restoring means, a member movable when an amount key is operated to index an amount for rendering the disabling means ineffective, means under the control of the blank cycle mechanism for rendering the disabling means ineffective following a blank cycle, and means under the control of the manipulative member for rendering the movable member ineffective even though an amount has been indexed upon the amount keys.

3. In a machine of the class described, indexing mechanism including amount keys, blank cycle enforcing mechanism, cycle controlling means, operation controlling keys connected therewith, means under the control of the indexing mechanism for normally causing the cycle controlling means to execute a single cycle upon operation of one of the control keys following operation of an amount key, and a double cycle upon operation of the control key without prior operation of an amount key, and means including an operable connection between another control key and said one control key and between said other control key and the indexing controlled means for depressing the said one control key and causing the cycle controlling means to execute three cycles of operation.

4. In a machine of the class described, indexing mechanism including amount keys, blank cycle enforcing mechanism, cycle controlling means, operation controlling keys connected therewith, means under the control of the indexing mechanism for normally causing the cycle controlling means to execute a single cycle upon operation of one of the control keys following operation of an amount key, and a double cycle upon operation of the control key without prior operation of an amount key, and means including an operable connection between another control key and said one control key and between said other control key and the indexing controlled means for depressing the said one control key and causing the cycle controlling means to execute an extra cycle in addition to the double cycle executed by the said depression of the said one control key.

5. In a machine of the class described having amount indexing mechanism, and machine operating mechanism including cycle-initiating means having a manipulative member, a latch for the cycle-initiating means, means normally effective to restore the latch during each machine cycle, means for disabling the latch restoring means, and means under the control of the indexing mechanism and the manipulative member for permitting or restraining operation of the disabling means in accordance with the operation to be performed as determined by the indexing or nonindexing of an amount and/or manipulation or nonmanipulation of the manipulative member.

WALTER A. ANDERSON.